United States Patent [19]

Hanson

[11] 3,966,327

[45] June 29, 1976

[54] ANGULAR DISPLACEMENT MEASUREMENT APPARATUS

[75] Inventor: Richard Arthur Hanson, Concord, Calif.

[73] Assignee: Systron Donner Corporation, Concord, Calif.

[22] Filed: Apr. 21, 1975

[21] Appl. No.: 569,839

[52] U.S. Cl. .................................. 356/138; 324/97; 350/285
[51] Int. Cl.² ........................................ G01B 11/26
[58] Field of Search ........... 356/138, 139, 152, 154; 324/97; 346/109; 33/285; 250/230; 350/285

[56] References Cited
UNITED STATES PATENTS

| | | | |
|---|---|---|---|
| 2,615,367 | 10/1952 | Murray et al. | 324/97 |
| 3,845,492 | 10/1974 | Tejada | 346/109 |

*Primary Examiner*—John K. Corbin
*Assistant Examiner*—Wm. H. Punter
*Attorney, Agent, or Firm*—Flehr, Hohbach, Test, Albritton & Herbert

[57] ABSTRACT

An apparatus for measuring small angular displacement of any object having an attached light reflective surface. A reflecting mirror is attached to the test object for receiving a light beam from a light source and for reflecting the beam toward an angular excursion amplifier. A beam position detector is included in the angular excursion amplifier together with adjustable means for directing the beam toward the beam position sensor. A second beam is directed toward the angular excursion amplifier for impingement upon a reflector mounted upon the adjustable means in the angular excursion amplifier. The reflected second beam is directed toward a scale having a linear gradient calibrated in terms of angular excursion of the test object. In this fashion minute excursion angles of the test object are presented at the scale as amplified linear sweeps of the reflected second beam. One embodiment visualizes manual adjustment of the adjustable means in the angular excursion amplifier while another embodiment visualizes servoed adjustable means in the angular excursion amplifier. Means are provided for aligning the light beams with the angular excursion amplifier and the scale. The angular excursion amplifier is positioned at a relatively short predetermined distance from the test object.

13 Claims, 4 Drawing Figures

ANGULAR DISPLACEMENT MEASUREMENT APPARATUS

BACKGROUND OF THE INVENTION

This invention relates to small angular displacement measurement apparatus and more particularly to a small angle test apparatus for use in obtaining known milliradian angular displacement with a high degree of accuracy.

High frequency dynamic precision measurement of small angular displacement is not now available. For example, angular displacement vibration sensors having 1 milliradian full-scale sensing capability are available but must be calibrated dynamically for scale factor prior to usage in the system wherein they are required. When high degrees of accuracy are required of such sensors, such as 0.1 percent of full-scale, a calibration reference is needed having sensitivity capability down to one microadian.

Static or very low frequency calibration of angular output from angular motion sensors designed to detect minute angular motion may be obtained using a beam autocollimator and an associated mirror for reflecting a beam through an angle according to sensor angular motion. Autocollimators are structurally complex and quite expensive.

A simplified and inexpensive calibration apparatus is therefore needed for determining minute static and dynamic angular motion.

OBJECTS AND SUMMARY OF THE INVENTION

In general, an angular displacement measurement apparatus is disclosed which has a main support frame positioned in close proximity to an object to which small angular motion is to be imparted. An optical table is positioned at a predetermined distance from the main support frame. A source of electromagnetic energy together with means for projecting the electromagnetic energy in the form of a beam is provided. The beam is projected toward the test object where it is reflected by a mirror mounted on the test object toward the optical table. The optical table mounts means for intercepting and for amplifying the angular excursion of the beam reflected from the test object which provides for an output indicative of the position of impingement of the beam upon the intercepting means. The intercepting means includes an angularly adjustable member for adjusting the output therefrom. Angular adjustment is an amplification of the angular excursion of the test object. A measurement of the angular adjustment provides an indication of the angular motion of the test object.

It is an object of the present invention to provide angular displacement measurement apparatus for minute static or dynamic angular motion.

Another object of the present invention is to provide angular displacement measurement apparatus which is insensitive to linear motion.

Another object of the present invention is to provide angular displacement measurement apparatus having a high degree of accuracy in terms of the full-scale minute angular motion.

It is another object of the present invention to provide angular displacement measurement apparatus utilizing optical methods and readily obtainable optical components.

It is another object of the present invention to provide angular displacement measurement apparatus requiring minimal linear separation between apparatus components for minimizing optical distortion due to thermal gradients in surrounding air.

It is another object of the present invention to provide an angular displacement measurement apparatus which may be either manually operated or servoed in conjunction with the output from an optical angular excursion amplifier.

Additional objects and features of the invention will appear from the following description in which the preferred embodiment has been set forth in detail in conjunction with the accompanying drawings.

DESCRIPTION OF THE PREFERRED EMBODIMENTS

Figure 1:
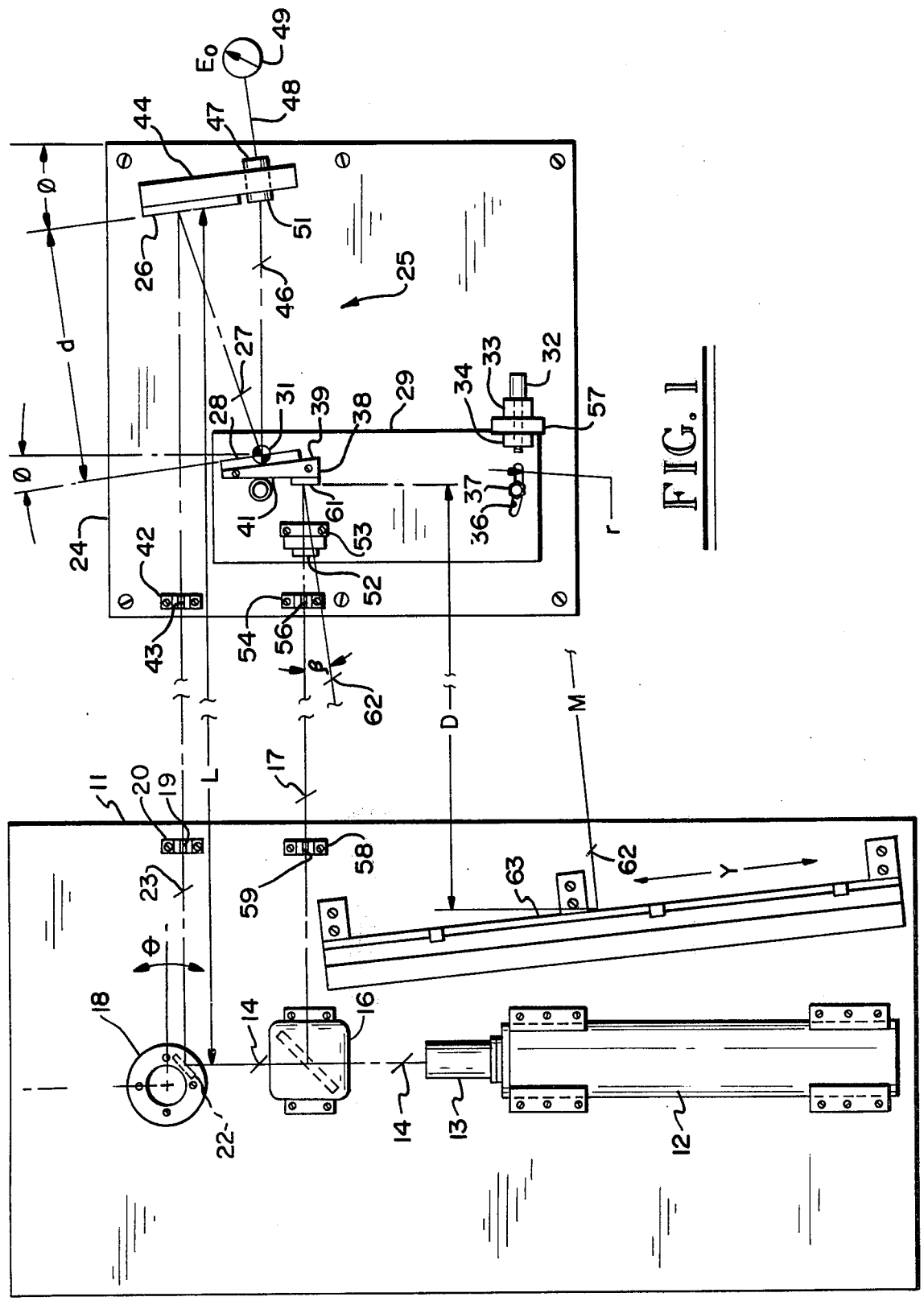
FIG. 1 is a plan view of an embodiment of the disclosed invention for manual measurement of angular motion.

An apparatus for measuring minute angular motion is disclosed herein, which may be used for calibration of minute angular displacement sensors or for general microradian measurement. Referring to FIG. 1 an embodiment is presented from which manual calibration of angular displacement may be obtained. A main support frame 11 is seen having a source of electromagnetic energy such as laser beam generator 12 mounted thereupon. Beam generator 12 has a decollimator 13 attached thereto for adjusting the focal point of an electromagnetic energy beam 14 for a purpose to be hereinafter described. Beam 14 is directed toward a beam splitter 16 which passes a portion of beam 14 therethrough and reflects a calibration beam 17 at right angles to beam 14 in this embodiment.

Beam 14, after passing through beam splitter 16, is directed toward a test object or device 18 which is subject to small angular motion. A reflecting mirror 22 is mounted to move with object 18 in the path of beam 14 for emitting a reflected beam 23 directed substantially parallel with calibration beam 17. Test object 18 is shown mounted on main support frame 11 only for convenience. Such mounting must be adjustable to intercept beam 14 and to emit reflected beam 23 from mirror 22 in a predetermined direction as hereinafter described.

Both reflected beam 23 and calibration beam 17 are directed toward an optical table 24 positioned at a distance designated L, from main support frame 11. Optical table 24 provides a base for an angular excursion amplification device 25 including, in this embodiment, a stationary reflecting mirror 26 positioned to intercept reflected beam 23. Stationary mirror 26 is oriented in such a manner that reflected beam 23 impinges thereupon at an angle of incidence other than 90°, as seen in FIG. 1. Stationary mirror 26 therefore reflects therefrom a second reflected beam 27 in a direction different from the line of beam 23. Reflected beam 27 is directed to impinge upon a rotatable mirror 28. Rotatable mirror 28 is mounted upon adjustment plate 29 which is capable of being adjusted rotationally about rotation center 31. Rotational adjustment of plate 29 is accomplished by adjustment of lead screw 32 which is mounted in a block 33 attached to optical table 24. Lead screw 32 enters a threaded block 34 attached to adjustment plate 29. A circular slot 36, having a radius r from rotation center 31, is provided in adjustment plate 29 through which a lock screw 37 is passed for threadable engagement with a threaded hole (not shown) in optical table 24.

Rotatable mirror 28 is mounted on a rotating mirror mount 38 which is fixed to adjustment plate 29. Rotating mirror mount 38 has first and second faces 39 and 41 thereupon, formed with an angle of divergence therebetween. The face of mirror 28 forms an angle $\phi$ with a perpendicular to the path of reflected beam 23. Angular excursion amplifier 25 is constructed so that when lead screw 32 is adjusted to place adjustment plate 29 in a neutral position the face of rotatable mirror 28 is in a plane parallel to the face of stationary mirror 26.

An end beam guide 20 is mounted on table 11 and another end beam guide 42 is mounted on optical table 24 in front of stationary mirror 26 in the path of reflected beam 23. End beam guides 20 and 42 have apertures 19 and 43 respectively therethrough for passing reflected beam 23. Apertures 19 and 43 are formed to have dimensions substantially the same as the cross-sectional dimensions of reflected beam 23 at that point in its path. End beam guide 20 is for the purpose of positioning the test object 18 relative to both tables 11 and 24 and is removed after positioning. End beam guide 42 is for the purpose of directing reflected beam 23 toward a central point on stationary mirror 26, and is removed after initial positioning of optical table 24 relative to main support frame 11. Stationary mirror 26 is mounted on stationary mounting block 44 attached to optical table 24 so that reflected beam 23 will impinge upon stationary mirror 26 at an angle departing from 90° by the aforementioned angle of divergence $\phi$.

Impingement of second reflected beam 27 upon rotatable mirror 28 emits a third reflected beam 46 therefrom directed toward a beam position sensor 47 mounted in stationary mounting block 44. Beam position sensor 47 may take the form of a null detector which provides an output signal connected through conductor 48 to indicator 49. In the described embodiment beam position sensor 47 provides a null output signal when third reflected beam 46 impinges upon the center of a sensitive face 51 on sensor 47. Sensitive face 51 is positioned in the same plane as the face of stationary mirror 26.

A removable mirror 52 is mounted in a predetermined location on adjustment plate 29 as determined by a pair of dowel pins 53 positioned therein. A middle beam guide 54 is available for mounting on optical table 24 in the path of calibration beam 17 having an aperture 56 therethrough for passing calibration beam 17. Middle beam guide 54 serves to locate calibration beam 17 as it passes through aperture 56 during set-up of the equipment. Calibration beam 17 is intercepted by removable mirror 52, and a shim 57 of predetermind width is inserted between block 33 and threaded block 34. In this condition optical table 24 is rotated so that calibration beam 17 passes through aperture 56 to impinge upon removable mirror 52 for reflection back through aperture 56 toward another beam guide 58 mounted on main support frame 11 in the path of calibration beam 17. Beam guide 58 has an aperture 59 therethrough for passing calibration beam 17 as well as its reflection from removable mirror 52. The aforementiond distance L extends from reflecting mirror 22 to the approximate center of mirror 26. After initial set-up and orientation of the equipment, beam guides 42 and 54 together with removable mirror 52 must be removed for operation of the equipment.

During operation of the equipment, calibration beam 17 impinges upon a calibration mirror 61 mounted on face 41 of rotating mirror mount 38. A reflected calibration beam 62 is emitted from the face of calibration mirror 61, directed toward a scale 63 mounted on main support frame 11. Scale 63 has linear gradations thereupon for calibration in terms of angular rotation of test object 18.

Figure 3:
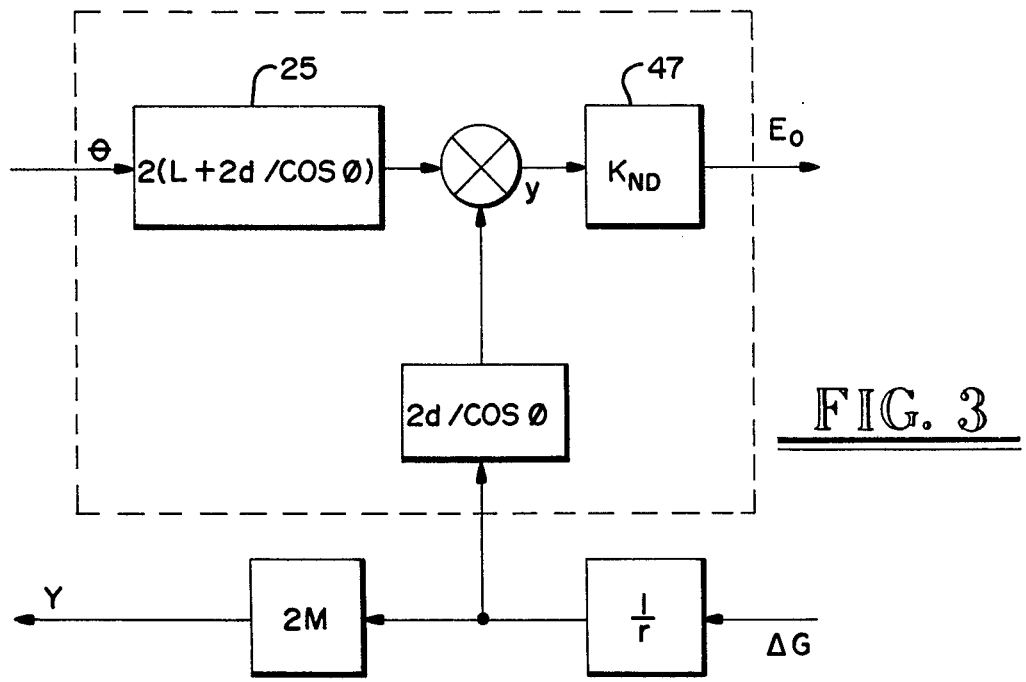
FIG. 3 is a block diagram of the embodiment of FIG. 1.

FIG. 3 is a block diagram of the system of FIG. 1 wherein the angle of rotation of test object 18 is represented by $\theta$. The distance between reflecting mirror 22 and the mirror 26 on the optical table 24 is represented by L, as defined above. The normal distance between the faces of stationary mirror 26 and rotatable mirror 28 is represented by $d$. As mentioned above the angular position of the face of mirror 28 relative to the perpendicular to the path of reflected light beam 23 is represented by the symbol $\phi$. An angle $\beta$ between calibration beam 17 and reflected calibration beam 62 is seen to be adjustable by manipulation of lead screw 32. An alternate embodiment provides for the position of mirror 61 to be adjustable angularly relative to movable plate 29. In this fashion beam 62 may be positioned to strike the center of scale 63 while adjustment plate 29 is fixed in a position such that mirror 28 is parallel to mirror 26. Thus center impingement of beam 62 on scale 63 may be obtained for any distance L between mirrors 22 and 26 which may be desired by the user. The distance between the center of calibration mirror 61 and the center of scale 63 when adjustment plate 29 is in the neutral position is represented by M. Scale 63, at approximately the center thereof, is substantially perpendicular to M. Thus a distance $M = (D/\cos\beta)$ exists between scale 63 and calibration mirror 61, over which reflected calibration beam 62 passes. D represents the distance parallel to L from the center of mirror 61 to the center of scale 63. D plus known assembly dimensions defines L. The excursion of reflected calibration beam 62 on scale 62 is represented by Y. The radius of rotation of adjustment plate 29 from the center of rotation 31 to the center of circular slot 36 is represented by $r$. With the above symbols in mind, the following relationships hold true:

$$\Delta\beta = \tan \Delta\beta = Y/2M$$

$$\Delta\phi = (\Delta\beta/2)$$

$$\Delta\phi = (Y/4M)$$

$$\frac{Y}{4M} = 2\Delta\theta \cdot (L + \frac{2d}{\cos\phi}) \cdot \frac{1}{2d/\cos\phi}$$

$$D = M\cos\beta$$

$$L = D + \text{(KNOWN DIMENSIONS)}$$

$$\Delta\theta = \Delta\phi \left( \frac{d}{L\cos\phi + 2d} \right)$$

-continued $$\Delta\theta = \frac{Y}{4M} \left( \frac{d}{L\cos\phi + 2d} \right)$$

Thus when M is set to provide a predetermined distance, it may be seen that all of the terms in the relationship defining $\Delta\theta$ are known or subject to computation, and therefore the angular excursion $\Delta\theta$ of the test object 18 is known.

The manner in which the equipment of FIG. 1 is set up to provide for angular measurement of a test object 18 undergoing an angular motion proceeds as follows. Beam splitter 16 is adjusted rotationally so that calibration beam 17 passes through aperture 59 in beam guide 58. Optical table 24 is positioned about 168 inches from main support frame 11 so that the calibration beam 17 passes through aperture 56 in middle beam guide 54. Calibration beam 17 is thereafter brought to bear approximately on the vertical and horizontal center of removable mirror 52 by adjustment of optical table 24 both vertically and horizontally. The position of test object 18 is adjusted so that reflected beam 23 passes through aperture 19 in beam guide 20 and through aperture 43 in end beam guide 42 for impingement upon stationary mirror 26. Adjustment shim 57 is placed as described above between blocks 33 and 34 for positioning adjustment plate 29 in the neutral position where mirror 28 is parallel to mirror 26. Middle beam guide 54 is removed and optical table 24 is rotated so that with removable mirror 52 in place, calibration beam 17 is reflected back through aperture 59 in beam guide 58. Thereafter removable mirror 52 is removed from adjustment plate 29. In the embodiments shown in FIGS. 1 and 2 the angle of mirror 61 is fixed at an angle predetermined for the desired table separation L and optical table 24 is now positioned so that reflected calibration beam 62 falls on the face of scale 63 at the same time that third reflected beam 46 falls on the face 51 of beam position sensor 47 so as to provide a null indication at indicator 49. Alternately mirror 61 could be adjustable to center beam 62 on scale 63 for any chosen table separation L. Decollimator 13 is provided to cause reflected calibration beam 62 to converge to a sharp point on scale 63. Additional shims similar to shim 57 are placed between blocks 33 and 34 and a measurement of beam translation Y on scale 16 is made. The separation between the main support frame 11 and optical table 24 is now defined by: $M = (10Y/2\Delta G)$ where Y is beam translation and $\Delta G$ is the dimension change which is imposed between blocks 33 and 34.

The angle of rotation of test object 18 is related to the translation Y of the reflected calibration beam 62 on scale 63. As motion of test object 18 causes beam 23 to move, the adjustment plate 29 is moved rotationally to provide null output from beam position sensor 47. For $M = 169.5$ inches, $d = 9.89$ inches, and $\phi$ up to 8°32 feet, as defined above, the angular motion $\Delta\theta$ of the test object 18 is related to the beam translation Y of reflected calibration beam 62 by 6.966 inches per milliradian within an accuracy of approximately 0.3 percent. The test object 18 may be moved angularly again and the adjustment plate 29 repositioned to obtain null output again from beam position sensor 47 at indicator 49. Beam translation Y on scale 63 which results from the adjustment from one null to the other is measured.

If $M_a$ represents the actual separation between scale 63 and the calibration mirror 61, the following relationship holds:

$$\Delta\theta = \frac{Y}{6.966} \times \frac{169.5}{M_a}.$$

It should be noted that the beam translation Y is linearly proportional to $\Delta\theta$ within a fraction of a percent for $\Delta\theta$ up to approximately 3 milliradians. The nonlinearity beyond 3 milliradians is systematic and may be compensated.

For dynamic measurements with the manually calibrated embodiment of FIG. 1, the adjustment plate 29 is positioned so that one peak of the oscillatory motion of reflected beams 23, 27, and 46 produces a null output from beam position sensor 47. The position of reflected calibration beam 62 is noted on scale 63. Adjustment plate 29 is then positioned so that the other peak of the motion of the motion of reflected beams 23, 27, and 46 produces a null output from beam position sensor 47. The new position of reflected calibration beam 62 on scale 63 is noted. Thus excursion Y is known, and $\Delta\theta$ may be found from the above relationship for $\Delta\theta$.

Figure 2:
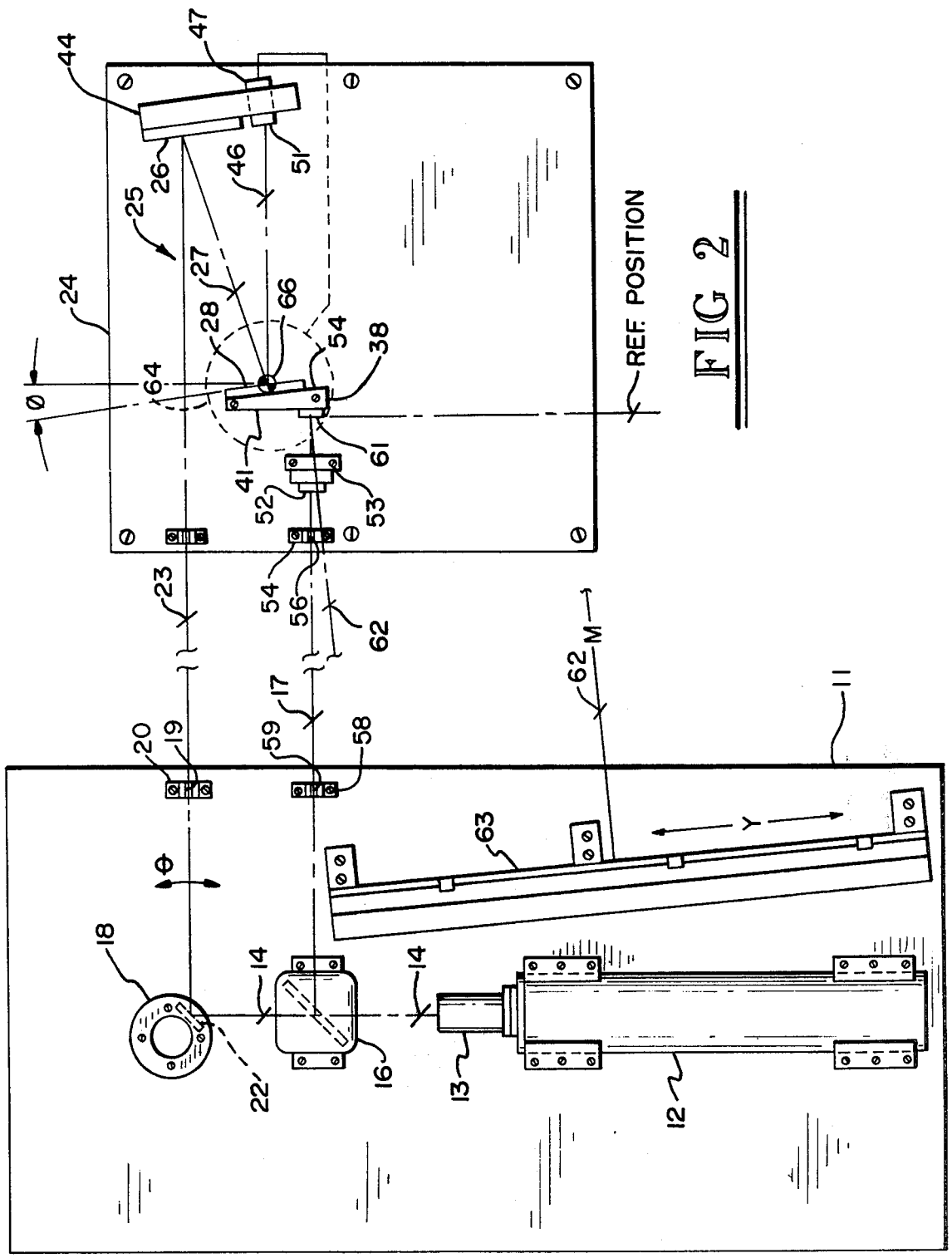
FIG. 2 is a plan view of another embodiment of the disclosed invention for servoed measurement of angular motion.

Another embodiment of the disclosed invention is seen by reference to FIG. 2. Like item numbers are identical in FIG. 2 with items seen in FIG. 1 where structure is the same. All elements on main support frame 11 are the same in FIGS. 1 and 2. Optical table 24 in FIG. 2 has stationary mirror 26 mounted on stationary mounting block 44 affixed to table 24. A servo motor 64 is mounted beneath optical table 24 having a shaft 66 extending therethrough upon which is mounted rotating mirror mount 38. Mirror mount 38 has rotatable mirror 28 mounted on first face 39 thereof and calibration mirror 61 mounted on second face 41 thereof.

By reference to FIG. 2 it may be seen that angular excursion of test object 18 through an angle $\theta$ will cause reflected beam 23 to traverse an angle. Angular excursion amplifier 25 mounted on optical table 24 amplifies the angle of excursion of reflected beam 23 which is sensed by beam position sensor 47 as third reflected beam 46 passes through the amplified angle. The output from beam position sensor 47 is coupled to servo motor 64 for driving rotating mirror mount 38 through the amplified angle to maintain impingement of third reflected beam 46 at a predetermined point on face 51 of sensor 47. The predetermined point on face 51 may be centrally located so that when third reflected beam 46 is held fixed by the angular motion of mirror 28 a null output is maintained from beam position sensor 47. In the embodiment of FIG. 2 reflected calibration beam 62 sweeps across scale 63 over the distance Y as rotating mirror mount 38 moves angularly. The beam translation Y is then measured and $\Delta\theta$ is obtained from the following relationship:

$$\Delta\theta = \frac{Y}{4M} \left( \frac{d}{L\cos\phi + 2d} \right).$$

As an alternative an angular displacement sensor, or a tachometer may be mounted to be driven by shaft 66. Thus the amplified angle $\Delta\phi$ may be directly read at the output of the sensor or the tachometer and $\Delta\phi$ is obtained from the following relationship:

$$\Delta\theta = \Delta\phi \left( \frac{d}{L\cos\phi + 2d} \right).$$

Figure 4:
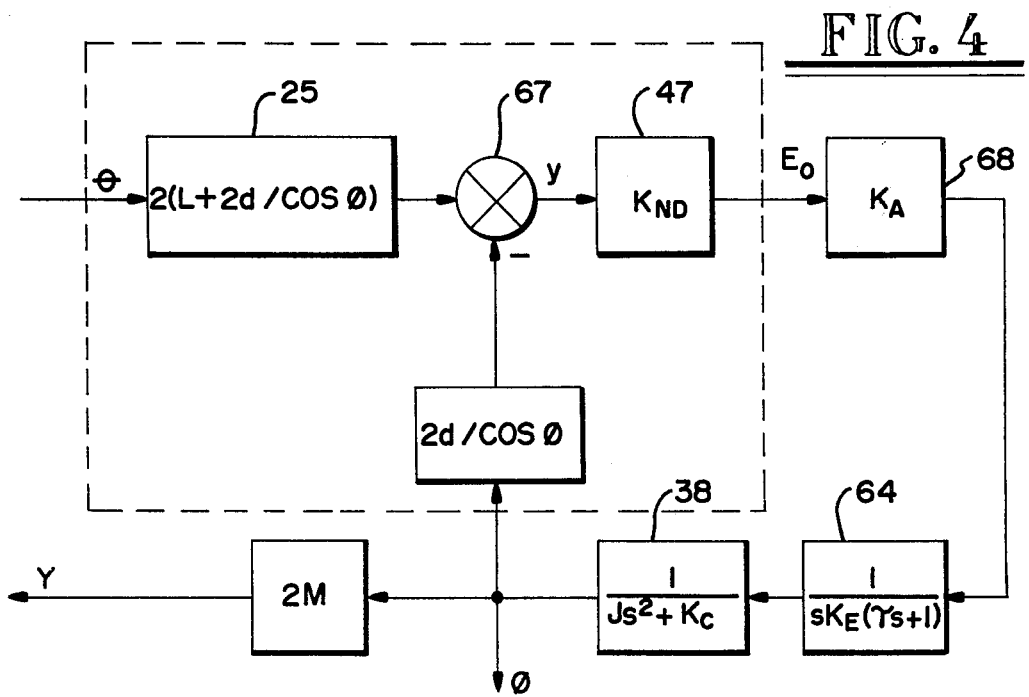
FIG. 4 is a block diagram of the embodiment of FIG. 2.

A block diagram of the embodiment of FIG. 2 is shown in FIG. 4 in which angular translation of test object 18 is represented by $\theta$. Angular excursion amplifier 25 is shown producing an amplified excursion angle directed to a summing point 67. Beam position sensor 47 provides an output $E_o$ directed to a servo amplifier 68. Servo amplifier 68 provides power for driving servo motor 64 which in turn drives rotating mirror mount 38. The angular motion of rotating mirror mount 38 is directed to summing point 67 for maintaining beam position sensor 47 at null. Reflected calibration beam 62 is also driven through an angular excursion by the rotation of calibration mirror 61 on rotating mirror mount 38 to provide beam translation Y on scale 63.

An angular displacement measurement system has been described which may be operated manually or in a servoed fashion. An amplified angular motion of an electromagnetic energy beam is measured to provide a highly accurate calibration of angular motion of any object having a reflective surface and properly positioned with respect to an electromagnetic energy beam source and an angular excursion amplifier.

What is claimed is:

1. An angular displacement measurement apparatus for determining small angular motion of a device, comprising a main support frame, an optical table in predetermined spaced relation with said main support frame, a source of electromagnetic energy mounted on said main support frame, means for receiving said electromagnetic energy and for forming a beam for projection toward the device, means adapted to mount the device for receiving said beam and providing an initial reflected beam directed toward said optical table, means for intercepting said initial reflected beam and for amplifying the angular excursion thereof mounted on said optical table, said last named means including a beam position sensor producing an output signal indicative of a position of impingement of said intercepted initial reflected beam thereon, means for adjusting the angular position of said means for amplifying thereby adjusting said position of impingement so that said output signal assumes a predetermined value, and means for indicating providing a measure of the angular motion of said means for amplifying in terms of the angular motion of said means adapted to mount the device.

2. An angular displacement measurement apparatus as in claim 1 together with a beam guide for aligning said initial reflected beam with said means for intercepting and amplifying, means for providing a calibration beam extending substantially parallel with said aligned initial reflected beam, a locating mirror on said optical table, and means for guiding said calibration beam to impinge on said locating mirror when said main support frame and optical table are in operating orientation, whereby said means for receiving said beam and said means on said optical table for intercepting said initial reflected beam are aligned in a common plane.

3. An angular displacement measurement apparatus as in claim 1 wherein said means for intercepting said initial reflected beam and for amplifying the angular excursion thereof comprises a first planar mirror for intercepting said initial reflected beam, said first planar being positioned so that said initial reflected beam impinges thereupon at a first angle of incidence, whereby a second reflected beam is emitted at said first angle of incidence from said first planar mirror, a second planar mirror for intercepting said second reflected beam, said second reflected beam impinging upon said second planar mirror at a second angle of incidence, whereby a third reflected beam is emitted from said second planar mirror at said second angle of incidence, said beam position sensor operating to sense when said third reflected beam impinges thereupon and to thereby produce said output signal, said second planar mirror being mounted on said means for amplifying and having an angular position thereon providing a predetermined angular reference therefor, said means for adjusting providing rotation of said second planar mirror through an angle sufficient to produce said predetermined output signal value from said beam position sensor.

4. An angular displacement measurement apparatus as in claim 3 together with means for forming an additional beam of electromagnetic energy for projection toward said optical table, wherein said means for indicating the angular motion of said means for amplifying includes a third mirror having a reflective face for exposure to said additional beam and mounted to move rotationally with said second mirror, so that when said additional beam impinges upon said third mirror a reflected additional beam is emitted therefrom, and actuation of said means for adjusting causes said reflected additional beam to undergo an angular excursion which is an amplification of the angular motion of the device.

5. An angular displacement measurement apparatus as in claim 4 together with a beam splitter, so that said initial reflected beam and said additional beam are both obtained from said source of electromagnetic energy, and a scale mounted at a distance from said third mirror substantially equivalent to said predetermined spaced relation between said optical table and main support frame so that said reflected additional beam impinges upon said scale, said scale being calibrated to indicate angular rotation of said means adapted to mount the device.

6. An angular displacement measurement apparatus as in claim 1 wherein said means for intercepting said initial reflected beam and for amplifying the angular excursion thereof, comprises a first mirror positioned to intercept said initial reflected beam thereby emitting a second reflected beam therefrom, said beam position sensor being positioned to intercept said second reflected beam, wherein said means for adjusting includes a servo motor mounted on said optical table receiving said output signal and providing output shaft rotation responsive thereto, said servo motor being coupled to drive said second mirror rotationally, so that when said initial reflected beam makes an excursion through an angle due to angular motion of said means adapted to mount the device said second mirror is driven rotationally to direct said second reflected beam to impinge upon said beam position sensor to produce said predetermined value of said output signal therefrom.

7. An angular displacement measurement apparatus as in claim 6 together with means for providing an indicator beam of electromagnetic energy directed toward said optical table, a third mirror mounted to rotate with said second mirror for intercepting said indicator beam, said third mirror providing a reflected indicator beam, means for intercepting said reflected indicator beam spaced from said third mirror at a distance substantialy equivalent to said predetermined spaced relation between said optical table and said main support frame, said means for intercepting said reflected indicator beam providing said measure of angular motion of said means adapted to mount the device.

8. An angular displacement measurement apparatus as in claim 7 wherein said means for intercepting said reflected indicator beam comprises a scale, graduations marked on said scale, said graduations being calibrated in terms of angular motion of said means adapted to mount the device.

9. An angular displacement measurement apparatus comprising a light beam source, first and second light beams emitted by said light beam source, said first light beam being subject to angular excursion of unknown magnitude, an angular excursion amplifier for receiving said first light beam and for providing an amplified angular excursion, means mounted on said angular excursion amplifier for intercepting said second light beam and providing a reflected light beam, and means for measuring the excursion angle of said reflected light beam, said means for measuring being calibrated in terms of angular excursion of said first light beam, whereby said unknown angular excursion magnitude is measured.

10. An angular displacement measurement apparatus as in claim 9 wherein said angular excursion amplifier comprises first and last mirror elements for reflecting said first light beam therebetween, said mirror elements being positioned to receive said first light beam and reflections thereof, a beam position sensor for receiving said first light beam reflected from said last mirror element and producing a beam position output, and means for adjusting the angular position of said last mirror element to provide a predetermined beam position output, and wherein said means mounted on said angular excursion amplifier comprises an additional mirror element mounted to rotate with said last mirror element.

11. An angular displcement measurement apparatus as in claim 9 wherein said angular excursion amplifier comprises first and last mirror elements for reflecting said first light beam therebetween, a beam position sensor for receiving said first light beam reflected from said last mirror element and producing a beam position output, and a servo motor for driving said last mirror element in response to said beam position output.

12. A method of measuring small angular displacement of a device secured to a mounting structure undergoing angular displacement, comprising the steps of directing a beam of light toward the mounting structure, reflecting the beam of light from the mounting structure, amplifying the angular rotation of the reflected beam, referencing the amplified angular rotation of the reflected beam to a stable angular reference position, adjusting the rotational position of the reflected beam which is amplified in angular rotation relative to the stable angular reference position, sensing the adjusted amplified angular rotation and providing an indication of departure of the adjusted angular position of the reflected beam from the stable angular reference position, and calibrating the indication of departure in terms of the angular rotation of the mounting structure.

13. An angular displacement measuring apparatus for determining small angular motion of a device, comprising a main support frame, a light source mounted on said main support frame for providing light energy, means for receiving said light energy operating to form a beam of light, said last named means directing said beam toward the device, an optical table in predetermined spaced relation with said main support frame, a reflector mounted to move with the device for intercepting said beam and reflecting an initial reflected beam toward said optical table, said initial reflected beam having a zero angle reference and moving through a first angle relative thereto as said reflector and device undergo angular motion, an angular excursion amplifier mounted on said optical table for receiving said initial reflected beam and providing an angular excursion amplified beam therefrom having a neutral angular reference position and moving through a second angle which is an amplification of said first angle, first and second reflecting mirrors included in said angular excursion amplifier having a predetermined distance therebetween, said amplification being related to the ratio of said predetermined spaced relation and said predetermined distance, said second reflecting mirror being mounted for rotational movement on said optical table, so that when angular motion of said initial reflected beam causes said angular excursion amplified beam to depart from said neutral angular reference position, said second reflecting mirror is rotated to realign said angular excursion amplified beam with said neutral angular reference, and means for measuring the rotation of said second reflecting mirror, said last named means providing indication of the magnitude of said first angle.

* * * * *